May 12, 1959 H. BARLEY ET AL 2,885,730
EXTRUSION APPARATUS
Filed March 30, 1953 2 Sheets-Sheet 1
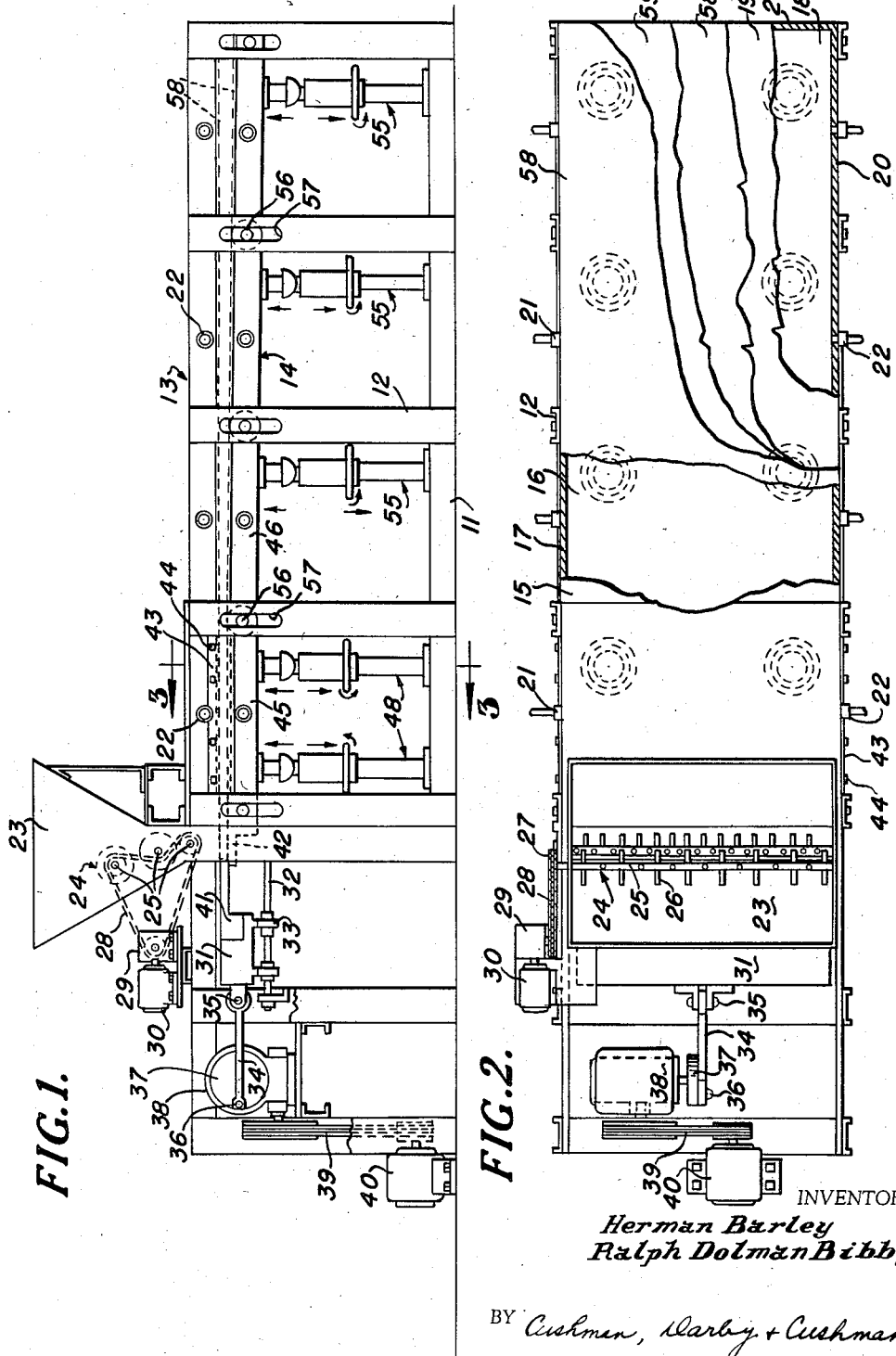
INVENTORS
Herman Barley
Ralph Dolman Bibby
BY Cushman, Darby + Cushman
ATTORNEYS May 12, 1959 — H. BARLEY ET AL — 2,885,730
EXTRUSION APPARATUS
Filed March 30, 1953 — 2 Sheets-Sheet 2

INVENTORS
Herman Barley
Ralph Dolman Bibby

BY Cushman, Darby & Cushman
ATTORNEYS

United States Patent Office 2,885,730
Patented May 12, 1959

2,885,730

EXTRUSION APPARATUS

Herman Barley and Ralph Dolman Bibby, Altavista, Va., assignors, by mesne assignments, to said Ralph Dolman Bibby Application March 30, 1953, Serial No. 345,386

4 Claims. (Cl. 18—12)

This invention relates to extrusion apparatus, and particularly to apparatus for the manufacture of boards and similar shapes from comminuted material and binder.

A principal object of the invention is to provide novel and improved apparatus particularly adapted for efficient conversion of wood chips and thermosetting resin binder into board or similar shapes, adapted for use as furniture panels, building elements, and the like.

Another object of the invention is to provide apparatus adapted to extrude comminuted material and binder with minimum power consumption.

A further object is to provide board extruding apparatus readily adjustable to a wide range of product thicknesses.

Still another object is to provide extrusion apparatus readily adjustable to maintain product uniformity, that is, to compensate for variations in character and condition of the feed material and other variables.

Further objects of the invention will be in part obvious and in part pointed out hereinafter.

The invention and the novel features thereof may best be made clear from the following description and the accompanying drawings, in which:

Figure 1 is a side elevational view, somewhat diagrammatic, of a preferred embodiment of the invention;

Figure 2 is a top plan view of the embodiment of Figure 1, partly broken away from the sake of clarity;

Figure 3:
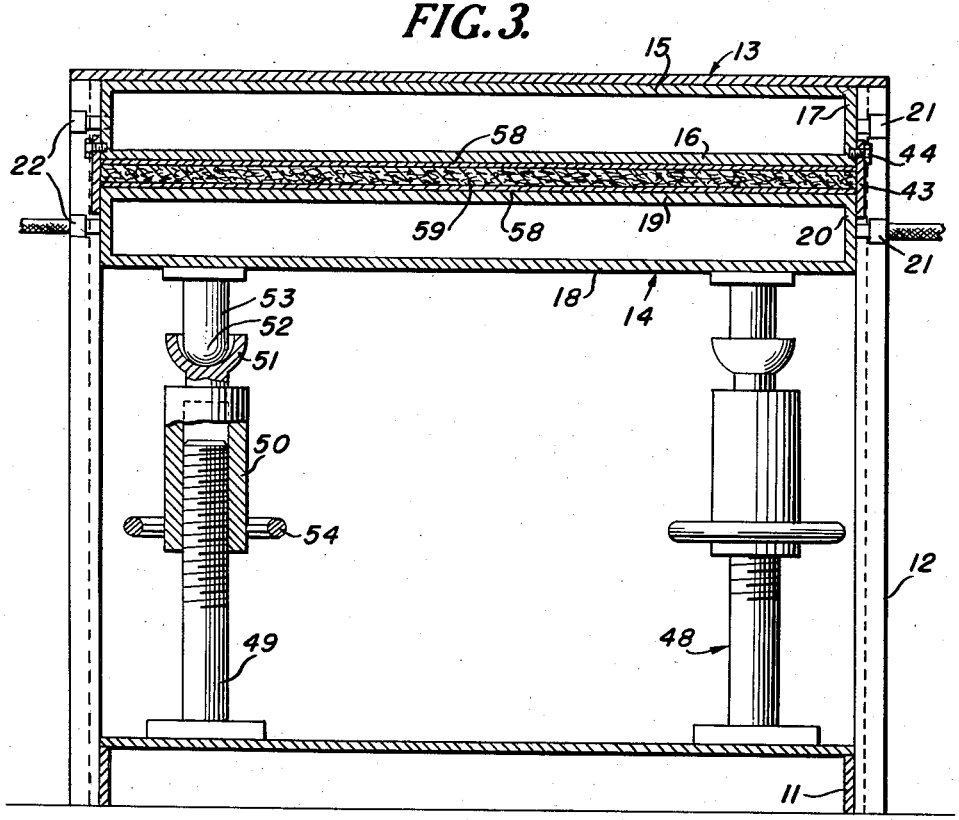
Figure 3 is a sectional view taken on the line 3—3 of Figure 1.

Referring to the drawings in detail, in Figures 1 and 2 is illustrated a frame 11 including multiple standards 12, and supported thereon two vertically spaced platens indicated generally as 13 and 14. The platens may be of conventional box type, upper platen 13 comprising outer panel 15, inner panel 16, and side panels 17, and lower platen 14 comprising outer panel 18, inner panel 19, and side panels 20. Conventional means may be provided for heating the platens, or portions thereof, steam inlets 21 and outlets 22 being shown for the purpose of illustration.

Adjacent and above the entry ends (left-hand as shown) of platens 13 and 14 a feed hopper 23 is suitably mounted on the frame, the feed hopper incorporating a plurality of mixing and agitating elements 24 adapted to facilitate feed of the material to the bottom of the hopper in uniform manner. As shown, the feed elements 24 may comprise shafts 25 having plural longitudinally and radially spaced prongs 26 extending outwardly therefrom, and the elements may be rotatably driven in diverse directions by means of sprockets 27 and chain 28, the chain 28 being engaged also to a source of power, such as reduction gear box 29 of electric motor 30.

Also adjacent the entry ends of the platens is mounted a ram 31, slidably supported for reciprocation in longitudinal direction on guide rods 32 by means of guides 33. Reciprocation of ram 31 is effected by a link 34 pivotally engaged thereto by pin 35, the other end of the link being pivotally engaged at 36 in eccentric manner to the drive plate 37 of a variable speed drive unit 38. Unit 38 may be driven through belts 39 by an electric motor 40.

Figure 4:
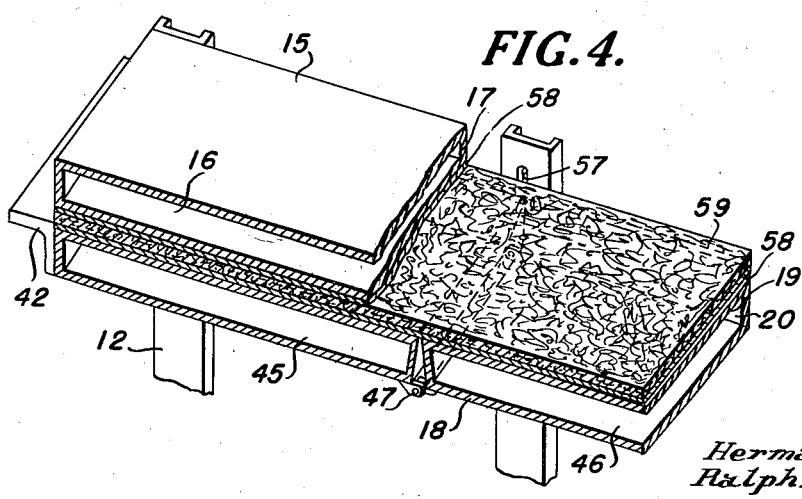
Figure 4 is a fragmentary perspective view illustrating the relationship between diverse sections of one platen.

Detachably fixed to the forward end of ram 31, as by bolts (not shown), is provided a ram plate 41, suitably sized and disposed to enter and fit closely between platens 13 and 14 at the forward end of the ram stroke. To support the ram plate 41 throughout that portion of its stroke beyond the limits of the platens, a lip plate 42 (see Figure 4) is secured to the entry end of lower platen 14, with the upper surface of the lip plate in general alignment with the inner surface of the platen.

As an outstanding feature of the invention, the platens of the apparatus comprise two or more distinct sections. The entry sections, which may be relatively short in length, define a forming passage of constant cross-sectional area, that is are disposed in parallelism. In conjunction with the entry sections of the platens, side plates 43 are provided, conveniently attached to one of the platens as by bolts 44, to completely confine the forming passage. The side plates 43 may be coextensive in length with the entry sections of the platens, or may extend therebeyond.

The trailing sections of the platens are slightly divergent, to define a passage of constantly increasing cross-sectional area. To accomplish this end, both platens may be divided into distinct sections, but more conveniently one platen may be planar and unitary. In the embodiment of the invention illustrated in the drawings, upper platen 13 is unitary, and its inner surface substantially planar. Lower platen 14 is divided into distinct entry and trailing sections 45 and 46, respectively, which may be hingedly or similarly connected on a transverse axis 47 (see Figure 4), whereby the relative angular relationship of the two sections may be varied. For obvious reasons, the adjacent inner edge of the trailing platen section 46 is disposed and maintained substantially in the plane of the inner surface of the entry platen section 45, as shown. If desired, the upper platen may be sectioned, and the lower platen unitary. In place of a sectioned platen, a unitary platen flexible about a transverse axis may be utilized. The platen sections, when distinct such as 45 and 46, need not necessarily be connected, but only maintained with adjacent ends in substantial alignment.

To adjust the spacing between the entry sections of the platens and provide thereby for the extrusion of shapes of varying thickness, the entry platen section 45 of lower platen 14 may be vertically adjusted with respect to upper platen 13 by means of a plurality of screw jacks 48. As best seen in Figure 3, the screw jacks 48 may comprise threaded posts 49 and internally threaded housings 50 rotatably engaged thereto. Atop each housing is provided a socket member 51, adapted to support and retain the rounded end 52 of a stud 53, extending from and secured to the underside of the platen. The entry section of lower platen 14, accordingly, is directly supported by the screw jacks 48. By means of a hand wheel 54 associated with each housing 50, the screw jacks may be manipulated to vary the vertical positioning of the entry section of the platen. If desired, the housings 50 of the screw jacks 48 supporting the entry platen section may be interengaged, as by a chain, to effect and insure adjustment in unison, as will be readily understood.

The inner end of the trailing platen section 46 will obviously retain its relationship with the entry section 45, in the embodiment shown, by reason of its connection thereto. As a further principal feature of the invention, however, the trailing platen section 46 may be angularly adjusted relative to entry section 45 by means of a plurality of longitudinally spaced screw jacks 55, which support the trailing section 46 and may be identical in detail with the screw jacks 48. That is, the angulation of the trailing section relative to the horizontal entry section, or in the embodiment shown about the hinge axis 47, may be adjusted by variable adjustment of screw jacks 55, thereby altering the small angle of divergence between trailing section 46 of the lower platen, and the upper platen. The sections of the lower platen may be guided in their movement by bosses 56 extending therefrom, riding in slots 57 provided therefor in the frame standards 12.

To improve the operation of the apparatus and the quality of the product produced thereby, relatively thin metal liners 58 may be provided inside the inner surfaces of the platens, coextensive in length therewith. The liners are preferably constructed of stainless steel, and present smooth, low-friction surfaces to the material being extruded, and also compensate for and alleviate the effect of any warpage which may occur in the platens. Particularly, the liner associated with the lower or sectioned platen is effective to cover the line of division between the platen sections, and prevent any detrimental effect therefrom.

Operation of the apparatus will now be described in detail. The platens being disposed as above described, material to be extruded is placed in hopper 23, and motor 30 energized to drive the mixing and feeding elements 24. The preferred material comprises chips of mixed hard and soft woods, and a thermosetting binder such as urea-formaldehyde resin as chief ingredients. Additives, such as flour as a binder extender, lubricants and the like may also be included. While not limited in utility thereto, the apparatus of the invention is most effective for extruding material of this nature to form boards and the like. When employing thermosetting binder, the platens must be at least partially heated. Particularly, the entry sections of the platens, defining a forming passage, must be at least partially heated, and the trailing platen sections may also be heated when desirable, such as in the case of extrusions of greater thicknesses.

Reciprocation of ram 31 is initiated by means of motor 40, whereupon the ram plate 41 will periodically compress portions of material fed to the bottom of hopper 23, forcing these portions successively into the forming passage of the apparatus, whereby a board 59 is formed by compression and extrusion in step-by-step fashion, as will be readily understood.

In the forming passage defined by the entry sections of the platens, relatively high pressure is maintained on the material, and such pressure together with the heat supplied by the platens is effective to stabilize the product in conforming cross-sectional shape. Accordingly, the material emerges from the forming passage in substantially rigid form, and is thereafter permitted to cure in passage through the diverging trailing sections of the platens. The diverging trailing platen sections have been found effective to maintain the stabilized form of the product until substantially cured, and quite contrary to expectation have been found to produce a superior, more uniform product. That is, continued high pressure after initial stabilization of the board results in a product of inferior strength, with wide variation in density and surface texture, as compared to the product of the present apparatus. Obviously, also, the diverging trailing sections offer a minimum of resistance to material passage therethrough, and consequently absorb minimum power. The divergent trailing platen sections not only generally enhance the curing of the board, but also permit the exit of steam therefrom without damage thereto. On exiting from the trailing ends of the platens, the product is adequately formed for sawing and/or other subsequent operations.

Extruding board from material as previously described, in a width of two or three feet and thickness of one inch, a stroke of approximately four inches and stroke interval of one second may be utilized with satisfactory results. An entry platen section length of eighteen to twenty-four inches is suitable, the temperature of the entry platen sections being maintained at or above 212° F. The angle of divergence between the trailing platen sections will in ordinary circumstances approximate one degree. The time of material stay in the forming passage may be varied by means of the variable speed drive unit 38, and the length of stroke may be made variable by providing for adjustment in the engagement between pivot 36 and drive plate 37 of the variable speed drive unit. By means of these adjustments, the time period available for stabilization of the product in the forming passage may be varied in accordance with product thickness and other factors, and the temperature of the entry platen sections may also be varied to control the stabilization.

The angular adjustment of the trailing platen sections, it has been found, is most critical in maintaining product quality and uniformity. Variations in quality and uniformity may occur with variations between batches of comminuted material used in the feed, with the character and nature of the adhesive incorporated in the feed, with different thicknesses of board, and other factors. To compensate for such variations, adjustment of the angle of divergence between the trailing platen sections has been found most effective, and an experienced operator may by this expedient maintain uniformity and quality of product throughout long runs.

As indicated previously, the apparatus may be adjusted for the extrusion of boards or similar elements of a wide range of thicknesses. The changeover to a product of different thickness is relatively simply and quickly accomplished. The machine being stopped, the entry section 45 of lower platen 14 may be adjusted to the desired spacing by means of screw jacks 48. The ram plate 41 may be removed from ram 31, and replaced with a ram plate of thickness corresponding to the new platen spacing. Thereupon, by manipulation of screw jacks 55, the trailing section 46 of lower platen 14 may be adjusted to desired angularity with respect to the new position of the entry section 45. Experience will indicate the most desirable initial angularity, and further adjustment may be made after operation is started. These adjustments having been made, operation to extrude and produce elements of the new thickness may then be commenced and proceeded with.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. Extrusion apparatus comprising upper and lower platens disposed in spaced and fixed relationship, said platens including corresponding distinct entry and trailing sections, the trailing sections of said platens being divergent, side members disposed laterally of said platens to define a forming passage of constant width therewith, material feeding means associated with the entry ends of said platens, a reciprocable ram disposed adjacent the entry ends of said platens and adapted to enter the forming passage defined by said platens and side members and fit closely therewithin, means for reciprocating said ram in alignment with said forming passage whereby its operative stroke terminates in said forming passage, and means for adjusting the angle of divergence between said platen trailing sections.

2. Extrusion apparatus comprising upper and lower platens disposed in spaced and fixed relationship, said platens including corresponding distinct entry and trailing sections, the trailing sections of said platens being divergent, side members disposed laterally of said platens to define a forming passage of constant width therewith, material feeding means associated with the entry ends of said platens, a reciprocable ram disposed adjacent the entry ends of said platens and adapted to enter the forming passage defined by said platens and side members and fit closely therewithin, means for reciprocating said ram in alignment with said forming passage whereby its operative stroke terminates in said forming passage, means for adjusting the spacing between said platen entry sections, and means for independently adjusting the angle of divergence between said platen trailing sections.

3. Extrusion apparatus comprising first and second platens disposed in vertically spaced and fixed relationship, said first platen being planar, said second platen including distinct entry and trailing sections, the entry section of said second platen being parallel to said first platen, the trailing section of said second platen being divergent from said first platen and angularly movable with respect thereto, side members disposed laterally of said platens to define a forming passage of constant width therewith, material feeding means associated with the entry ends of said platens, a reciprocable ram disposed adjacent the entry ends of said platens and adapted to enter the forming passage defined by said platens and side members and fit closely therewithin, means for reciprocating said ram in alignment with said forming passage whereby its operative stroke terminates in said forming passage, and means for adjusting the angulation of said trailing section relative to the entry section of said second platen.

4. Extrusion apparatus comprising first and second platens disposed in vertically spaced and fixed relationship, said first platen being planar, said second platen including entry and trailing sections separated by a transverse line of division, the entry section of said second platen being parallel to said first platen, the trailing section of said second platen being divergent from said first platen and angularly movable relative to said entry section substantially about said line of division, a relatively thin, flexible metal liner disposed inside said second platen and extending over said line of division, and means for adjusting the angulation of said trailing section relative to the entry section of said second platen.

References Cited in the file of this patent

UNITED STATES PATENTS

| | | |
|---|---|---|
| 2,096,338 | Randall | Oct. 19, 1937 |
| 2,122,703 | Weinreich | July 5, 1938 |
| 2,143,549 | Edmonds | Jan. 10, 1939 |
| 2,332,170 | Sapp | Oct. 19, 1943 |
| 2,365,326 | Bailey | Dec. 19, 1944 |
| 2,455,442 | Robinson | Dec. 7, 1948 |
| 2,512,506 | Saint Denis | June 20, 1950 |
| 2,572,677 | Tench | Oct. 23, 1951 |
| 2,648,262 | Croston et al. | Aug. 11, 1953 |
| 2,649,034 | Gramelspacher | Aug. 18, 1953 |
| 2,673,370 | Goss | Mar. 30, 1954 |

FOREIGN PATENTS

| | | |
|---|---|---|
| 480,508 | Great Britain | Feb. 23, 1938 |